United States Patent [19]

Matheny

[11] 3,941,943
[45] Mar. 2, 1976

[54] PRIVACY CIRCUIT FOR KEY TELEPHONE SYSTEMS

[75] Inventor: Coy Edwin Matheny, Corinth, Miss.

[73] Assignee: International Telephone and Telegraph Corporation, New York, N.Y.

[22] Filed: Aug. 8, 1974

[21] Appl. No.: 495,580

[52] U.S. Cl. ............................. 179/99; 179/32
[51] Int. Cl.² ......................................... H04M 1/70
[58] Field of Search.... 179/99, 18 FA, 17 B, 19–22, 179/30, 38, 32

[56] References Cited
UNITED STATES PATENTS

| | | | |
|---|---|---|---|
| 3,725,601 | 4/1973 | Jetzt et al. | 179/99 |
| 3,819,866 | 6/1974 | Hawley | 179/18 FA |
| 3,860,763 | 1/1975 | Sudoh et al. | 179/99 |

Primary Examiner—Kathleen H. Claffy
Assistant Examiner—Randall P. Myers
Attorney, Agent, or Firm—James B. Raden; Marvin M. Chaban

[57] ABSTRACT

In key telephone systems where a plurality of stations have access to a line by merely depressing a line key, a circuit is provided to prevent that station from entering a busy line. The circuit uses a single relay per station to provide a normal condition of privacy for any line at a station to equipped. The circuit senses the condition of the line and on a busy condition, the station cannot access the busy line. By providing all stations of a key group with privacy circuits, all stations can have complete privacy on line calls. Privacy control is possible on less than all stations of a system and less than all lines by selective deployment of privacy circuits. Optionally, a privacy release button can be provided to allow a station to enable other stations to access that busy line. Protection has been built into the circuit against transient surges and the like.

4 Claims, 1 Drawing Figure

U.S. Patent  March 2, 1976  3,941,943
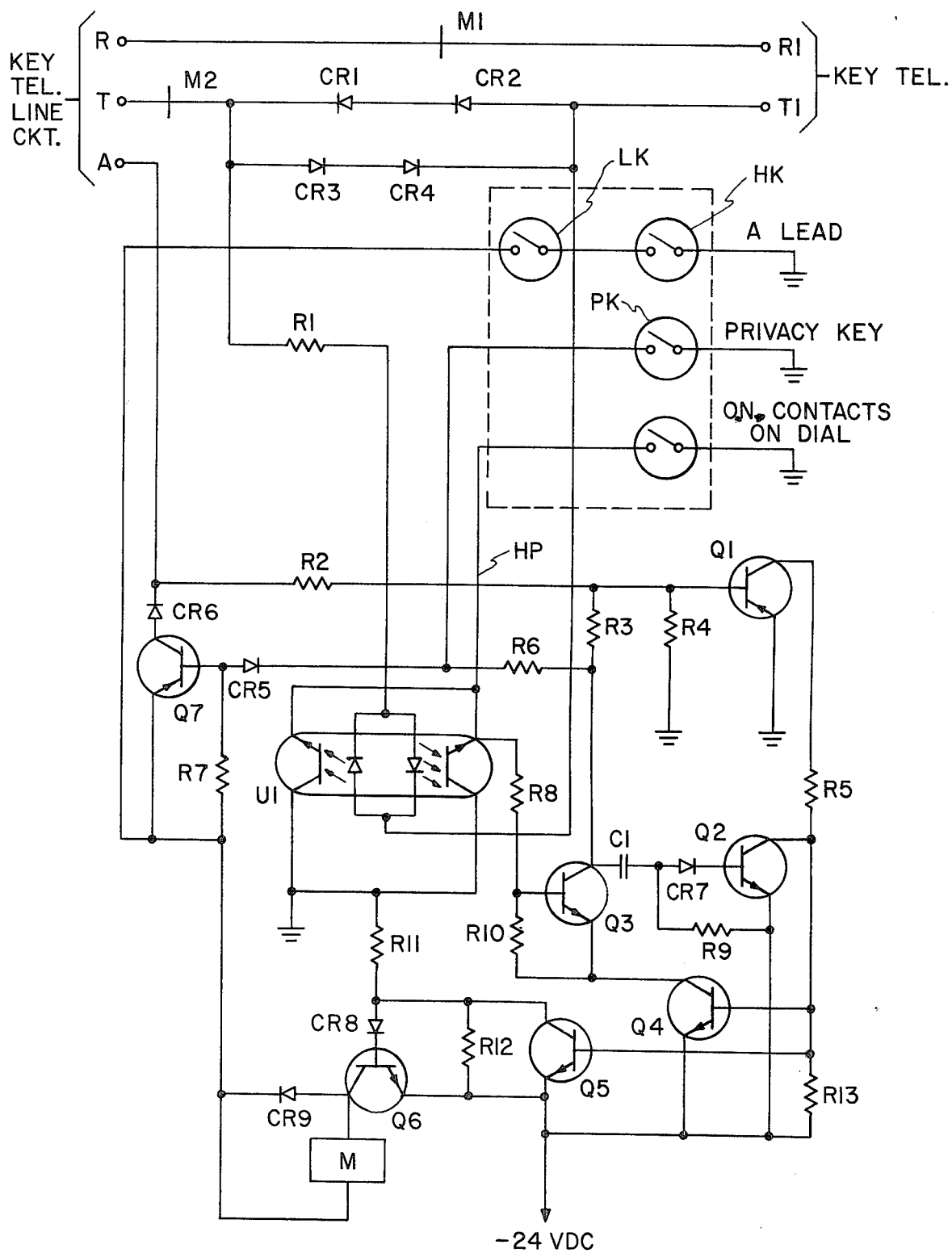

PRIVACY CIRCUIT FOR KEY TELEPHONE SYSTEMS

BACKGROUND OF THE INVENTION

A key telephone system is one which has multiple stations having access to one line and has multiple lines terminating at each station of the group. Each station instrument or subset has a line or pick-up key, one per line which may be individually depressed to allow that particular telephone line to be accessed by the station for use. When the line is in use, a direct current flow in that line, and a visual indication is usually presented of the busy condition of the line.

In the usual key system, when a line is in use, any other station may access that line and join or listen in on the conversation. To prevent this free access and to provide a privacy option, a relay and logic circuitry may be provided in such a manner to deny entry into a busy line of the key telephone system. One well-known approach is to sense the condition of the A lead between the line circuit and the key station and to provide the access denial responsive to the sensed condition.

When the line circuit is in the idle, ring up, or hold condition or mode of operation, the well-known A lead of the key telephone line circuit will have a negative voltage of approximately −24 volts D.C. on it. When the line circuit is busy, the A lead of the key telephone line circuit will have a very low negative voltage or approximately ground on it, the ground usually being drived from a switch at the station instrument. When a voltage of −24 volts is present on the A lead of the line circuit, a key telephone station with a privacy circuit installed can access that line circuit, but when ground is present on the A lead of the line circuit, it cannot be accessed by the key telephone station. Once a line circuit is accessed by a station, that station applies a ground to the A lead of the line circuit. Thus, privacy is established using the condition of the A lead circuit for initiation of the control circuit.

The privacy circuits as presently constituted utilize two relays and/or changes to the mechanical structure of the key telephone. One relay is used in one known system; however, a special phone must be used to provide this feature.

SUMMARY OF THE INVENTION

A line circuit to which the present invention may be applied is one such as that of U.S. Pat. No. 3,436,488 to Barbato and known as the Bell 400D Line Card. The privacy circuit is interposed between the line circuit of a line for secrecy and the station to be denied busy access to that line. The only circuits of interest external to the key telephone station are the speech leads such as the tip, ring, leads and the auxiliary control generally known as the A lead between the station instrument and the key telephone line circuit. Because of the construction of a usual line circuit, a voltage of −24 VDC is present on the A lead of a line circuit when it is idle in the hold or ring up condition. The tip and ring leads have a battery feed voltage applied to them and when terminated into a resistance (network of a telephone) produce a current flow. This current flow and the condition of the A lead of the line circuit (−24 VDC or ground) provide the necessary indication for the present circuit.

Only a single relay with two normally closed contacts is used herein. When −24 VDC is present on the A lead of the line circuit, the privacy circuit will allow the station user to access that line, but when ground is present it cannot be accessed. Once the line is accessed by the station user, the privacy circuit in that station latches in the accessed position and applies a ground to the A lead of the line circuit which prevents any other station equipped with a privacy circuit from accessing the busy line.

As an optional feature, any other station of the key group can be allowed to join in the conversation by depressing the privacy release button of the station originally busying the line.

When a line is in use and a second station tries to access that line, the privacy relay for the second station will be energized and the second station is disconnected from the busy line. The privacy circuit allows normal use of the key telephone set during conditions of power failure since the normally closed contacts of the privacy circuit remain in their normal state.

The connections between a telephone line and a privacy circuit may preferably be made at the common output of the pick-up key block of a station instrument and the network of the key telephone instrument or subset.

It is therefore an object of the invention to provide a privacy circuit for a station of a key telephone system which will prevent that station from accessing a busy line which is accessible at the station when said line is not busy.

It is a further object of the invention to provide a key telephone system in which one or all of the stations of a line may be equipped with individual privacy circuits to prevent all stations so equipped from accessing a busy line.

It is a further object of the invention to provide individual circuits for a station of a key telephone system by which one or more lines may be maintained against access by said station when the lines so equipped are busy.

It is a still further object of the invention to provide a privacy circuit for a key telephone system in which the privacy feature is normally in force and may be overridden by a station wishing to allow the line to be accessed by a second station which would otherwise be denied access to that line.

Other objects, features and advantages of the invention may become apparent from the following detailed specification viewed in conjunction with the drawing.

BRIEF DESCRIPTION OF THE DRAWING

The drawing is a schematic diagram of a privacy circuit according to this invention.

DETAILED DESCRIPTION OF THE PREFERRED EMBODIMENT

As mentioned previously, and as shown in the drawings, the disclosed privacy circuit is interposed between a line circuit and a station instrument to deny that station access to the line represented by the line circuit.

The two basic conditions of a telephone line and the two basic conditions of the A lead of the line circuit are used by the privacy circuit to perform its function. The telephone line may have line current flowing (busy) or may have no line current (available). The A lead circuit of a line circuit may be at approximately −24 VDC (available) or may be at ground (busy).

When voltage of −24 VDC is present on the A lead of the line circuit indicating that the line is not busy, transistor Q1 of the privacy circuit of the drawing is turned on which turns on transistors Q4 and Q5. Transistor Q4 applies a voltage of −24 volts D.C. to the emitter of transistor Q3 which is in the non-conducting state until line current flows from T to T1 or vice versa. The flow of line current passing through resistor R1 turns on optoisolator U1. U1 turns on transistor Q3. Q1 is latched in the "on" state by the negative voltage (−24 VDC) supplied over a path from transistors Q4 and Q3, and resistor R3 to the base of transistor Q1. The −24 VDC at the collector of Q3 also turns on transistor Q7 by drawing base current from Q7 over a path through resistor R6 and diode CR5. No denial of access to the line is provided by the privacy circuit being in this state.

A ground is closed to the A lead via the hookswitch HK of the key telephone set in a well-known manner when the station goes off-hook. This ground causes transistor Q7 to saturate and the ground from the A lead is applied to terminal designated A which is connected to the A lead of the line circuit. This ground on the A lead busies out the line circuit and prevents any other station from accessing that particular telephone line unless invited to join by the user. Should the person using the telephone line want another station to join the conversation, he can allow this entry by a second station (equipped with a privacy circuit) by depressing a privacy release key PK at the station instrument. The PK key has a normally open set of contacts with one side connected to ground and the other connected to the cathode of diode CR5. The ground through the PK contacts turns off transistor Q7 and places the line circuit in the hold condition. The potential on the A terminal to the line circuit is no longer at ground potential, but changes to approximately −24 VDC. This ground removal allows another privacy circuit to access that line, since the line does not appear busy to the privacy circuit of the other line. As long as the first user does not switch lines or hang his handset back on the cradle, the conversation can be shared by the added station on the line.

The single relay of the privacy circuit, the M relay, has remained de-energized due to the initial conditions of line seizure. As mentioned previously, on seizure of the line and the privacy circuit, transistors Q1 and Q5 were turned on serially, Q6 remained turned off because the voltage between its emitter and base junction had been insufficient to turn it on.

The first user of the line can remain on the line when he depresses the privacy release because his circuit has a latched condition which may be traced as follows: Once the telephone line circuit A lead has −24 VDC bias applied, the only way this bias can be replaced by a ground is by turning on transistor Q7. To turn on transistor Q7, transistor Q1 is turned on by the −24 VDC on the A lead which is connected to A terminal. Transistor Q1 turns on and turns on transistor Q4. Transistor Q4 supplies −24 VDC to the emitter of Q3.

The M relay has remained de-energized and current continues to flow between speech lead terminals T and T1, and R to R1, of the privacy circuit. The line current between terminals T and T1 flows through one of the light-emitting diodes of U1 and the light from the light-emitting diode turns on its photo transistor. (The direction of current flow is irrelevant since there are two optoisolators with diodes reversed and connected in parallel. The two photo transistors are connected collector to collector and emitter to emitter. The collectors are connected to ground and the emitters are connected to resistor R8.) When current flows through either optoisolator LED, the coupled photo transistor is turned on. The conductive photo transistor applies a ground from its emitter to resistor R8 and turns on transistor Q3. Transistor Q3 applies the −24 volts direct current from its emitter to resistors R3 and the base of transistor Q1 and to resistor R6. Transistor Q1 latches in the on state and turns on transistor Q7. Transistor Q7 applies a ground via diode CR6 to the A lead terminal to the line circuit. The voltage that initially turned on transistor Q1 is no longer present, but a holding voltage has been generated by the flow of line current in the speech lead from terminal T to terminal T1 or T1 to T depending upon the polarity of the line. This holding voltage exists until either the handset is placed on hook or another pick-up key on the key telephone is depressed.

When the user of the key telephone switches from his already accessed line to a line accessed by another key telephone set, the following events occur: There will be a momentary break in line current which will cause the photo transistor U1 to turn off briefly. This interruption in photo transistor current will cause transistor Q3 to turn off momentarily. The change in collector current of transistor Q3 is capacitively coupled to the base of transistor Q2 via diode CR7. Transistor Q2 saturates, connecting −24 VDC to the bases of transistors Q4 and Q5. Transistors Q4 and Q5 turn off. The −24 VDC from the collector of transistor Q4 is removed from the emitter of transistor Q3. At this time, ground is present from resistors R3 and R4 and the series connection of resistors R6 and R7 and diode CR5 to keep base current flowing through transistor Q2 until capacitor C1 charges. Once capacitor C1 charges to a point where the base current of transistor Q2 is insufficient to generate a collector current of sufficient magnitude to keep transistors Q4 and Q5 turned off, the A lead connection to the line circuit will have control. But with ground present on the A lead terminal from the line circuit, transistor Q1 remains cut off and transistors Q4 and Q5 remain cut off.

When transistor Q5 is cut off, transistor Q6 conducts and energizes relay M. Relay M takes approximately 10 milliseconds to operate once transistor Q6 turns on. Relay M on operation, opens its normally closed contacts M1 and M2 in the tip and ring leads respectively.

Diodes CR1, CR2, CR3 and CR4 and resistor R1 are used to protect the light-emitting diodes of the optoisolator. With a line current maximum of 100 milliamperes, approximately 50 ma would flow in both the series diodes and the light-emitting diode circuit. A typical voltage drop across the two LED's would be 1.54 volts with a maximum of 1.8 volts. With 1.54 volts across resistor R1 and the light-emitting diode, approximately 30 ma would flow in resistor R1 and the LED, the drop across resistor R1 being .3 volts and across the LED, 1.2 volts. If 1.8 volts were present across resistor R1 and the LED, then approximately 55 milliamperes would flow through resistor R1 and the LED with 0.55 volts drop across resistor R1 and 1.27 volts drop across the LED. Thus the current through the LED is limited to a value considerably less than the maximum of 80 milliamperes.

Diode CR6 is used to prevent the −24 volts direct current from the power supply from reaching the A lead to the line circuit. Diode CR9 protects transistor Q6 from the transients generated by the relay coil M when transistor Q6 is turned off. Diode CR8 produces an additional voltage drop which must be overcome to allow transistor Q6 to turn on. This diode guarantees that the saturation voltage of transistor Q5 will be low enough to turn off transistor Q6. Diode CR7 protects the emitter base junction of transistor Q2. Diode CR5 is used to insure that when a ground is connected to the cathode of diode CR5, transistor Q7 will turn off and diode CR7 will block the negative voltage (−24 VDC) if it is present and keeps it from activating transistor Q1.

The second set of off normal contacts on the dial ON are used. When the dial is activated, the off normal contacts short and place ground on lead HP. Lead HP provides a holding path which is in parallel with the optoisolator and keeps transistor Q3 turned on. This path completes the loop of transistors Q1, Q4 and Q3. During dialing, transistor Q5 is conducting and the relay driver, transistor Q6, is turned off. This sequence prevents the relay M from fluttering during the dialing operation. There is no need for the off normal contact connection when a pushbutton tone dial is used since there are no interruptions of line current during the pushbutton tone dialing.

The circuit as described can be installed in any key telephone set with a rotary dial that has an available set of off normal contacts. There is no need for the off normal contact connection when a pushbutton dial is used since there are no interruptions of line current during the pushbutton dialing operation. Needless to say, each type of phone would require a different packaging or mounting approach, but the electrical operation of the circuit would not vary.

Another feature of the circuit is that it does not require mechanical linkages to the pick-up key mechanism. The two optoisolators detect the presence or absence of line current. Minimal losses of less than 1.4 volts at a minimum line current of 20 milliamperes would occur as a result of using the dial optoisolators. The light-emitting diodes of each optoisolator are connected cathode to anode and vice versa. The circuit thus is independent of the direction of the current flow in the line. A loss of 1.4 volts at 20 milliamperes is equivalent to 70 ohms series resistance in a telephone line. This arrangement also allows that two privacy circuits could conference with an outside party on a minimum line current, necessary for central office supervision.

A still further feature is that a single relay is used. Besides providing privacy, operation of the system in the event of a power failure is obtained, since the relay is energized only when excluding its user from a busy line. Monitoring of the A lead to the line circuit results in a power supply current of approximately 5 milliamperes when the pickup key of an accessible line is depressed, even if that station's handset is on hook.

Also, the circuit amplifies any break in line current, using that break period to shut down the circuit until the condition of the A lead of the line circuit can be rechecked automatically to determine if the selected line circuit can be accessed by the key telephone set user. This feature is accomplished by C1, CR1, R9, Q2 and the loop of Q1, Q4 and Q3.

The optoisolator diodes are protected by the series and parallel connections of diodes CR1, CR2, CR3 and CR4 which limit the voltage that appears across the light-emitting diodes and resistor R1. Resistor R1 limits the current through the light-emitting diodes by using that current to produce a voltage drop and thereby reduce the available voltage to the light-emitting diodes.

With the principle of a privacy individual to a station and to a line, certain stations of a key group may be denied access to certain lines when busy, other stations may be denied access to all busy lines and other stations may be allowed access to all lines, whether busy or not. By providing a privacy circuit for each station which is to be denied access to some or all lines when busy, a separate circuit being necessary for each line to which such access is to be denied. Thus, if in a group of five stations having access to two lines, a maximum of ten privacy circuits could be used for full secrecy or privacy. If three stations are to be denied access to both lines when busy, one station is to be denied access to line A when busy and the final station is to be allowed access to both lines at all times, seven privacy circuits would be employed interfaced between the stations and lines circuits for denied busy access.

Thus, a system of flexibility in denial of busy access may be provided in the manner disclosed herein. Other modifications in the approach may be made, and it is intended to cover in the appended claims all such modifications which fall within the true spirit and scope of the invention.

I claim:

1. In a key telephone system in which each station has access to a plurality of lines with each line having loop conductors for completing a talkpath from a line to a station and a control lead conductor, and in which said control conductor is in a first condition when its line is idle and a second condition when its line is busy, means responsive to a line becoming busy for applying said second condition to the control conductor of said line, a privacy circuit for each said station including means for sensing said second condition in said control conductor of a line completed to said station, means for enabling said privacy circuit responsive to a sensed second condition, means for latching said privacy circuit in an enabled condition, means for sensing the presence of line current in a line loop of said completed line for causing the operation of a privacy relay in said privacy circuit only when said privacy circuit is not latched, and contacts of said privacy relay for opening the line loop conductors responsive to operation of said relay to prevent access to said line by the station with its relay contacts open.

2. In a system as claimed in claim 1, wherein the loop condition sensing means in said privacy circuit comprises an electro-optical coupling device.

3. In a system as claimed in claim 1, wherein said station has a privacy release button and means responsive to the depression of that button for causing said control conductor to enter said first condition.

4. A key telephone system having a plurality of stations which may have access to a key system line, in which the line has a pair of loop conductors for completing a speech path from the line to stations having access thereto and a control conductor; the invention comprising a privacy circuit at each of said stations, a privacy lockout relay in all privacy circuits, means in a privacy circuit at a first station accessing said line for grounding said control conductor to all stations having access to the busy line, means in the privacy circuit at said first station responsive to the busy condition on said one line for enabling said privacy circuit and for latching said circuit operated, means in the privacy circuit at any other station responsive to said other station attempting to access said line for sensing the presence of current in one of said loop conductors of the loop pair for the busy line for causing operation of the privacy relay at said other station only when said privacy circuit at said other station is not latched, and means in said other privacy circuit responsive to the operation of said privacy relay for opening the line loop conductors to the station having an operated lockout relay.

* * * * *